C. A. ERICKSON.
PNEUMATIC SUSPENSION FOR VEHICLES.
APPLICATION FILED JAN. 20, 1911.
1,104,294.
Patented July 21, 1914.
3 SHEETS—SHEET 2.
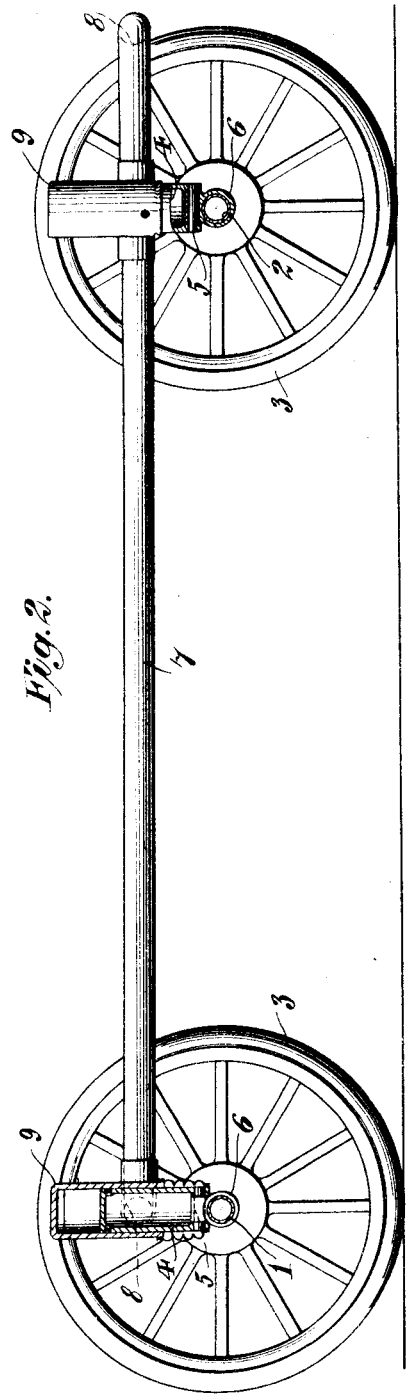
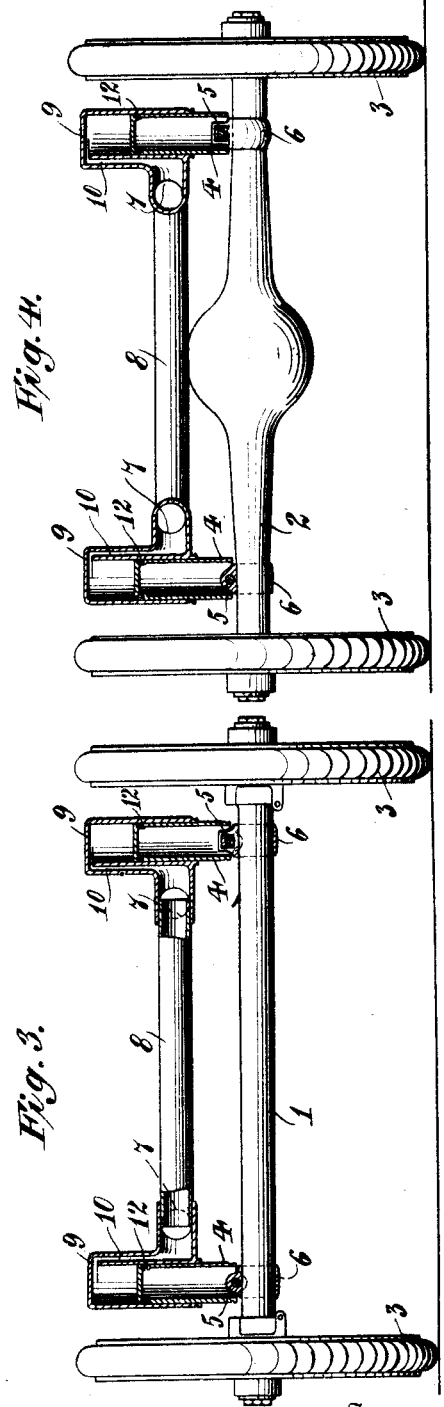

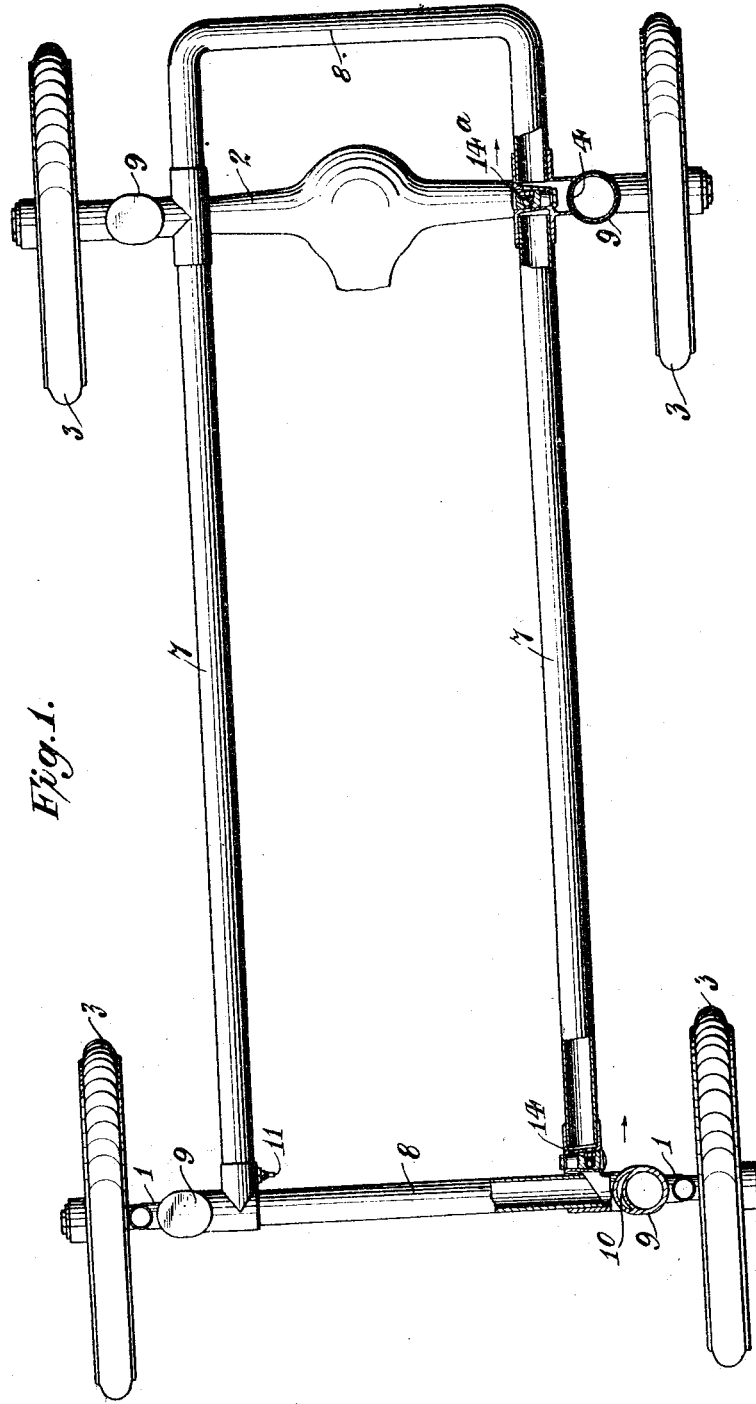

C. A. ERICKSON.
PNEUMATIC SUSPENSION FOR VEHICLES.
APPLICATION FILED JAN. 20, 1911.
1,104,294.
Patented July 21, 1914.
3 SHEETS—SHEET 3.
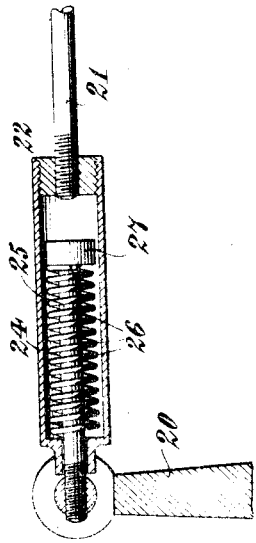
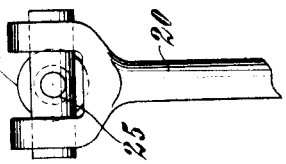
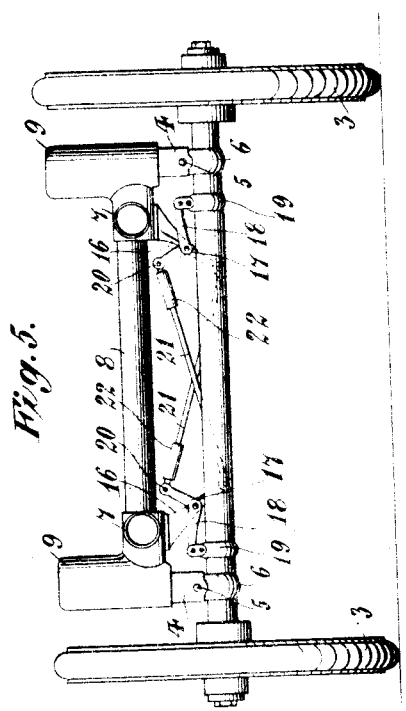
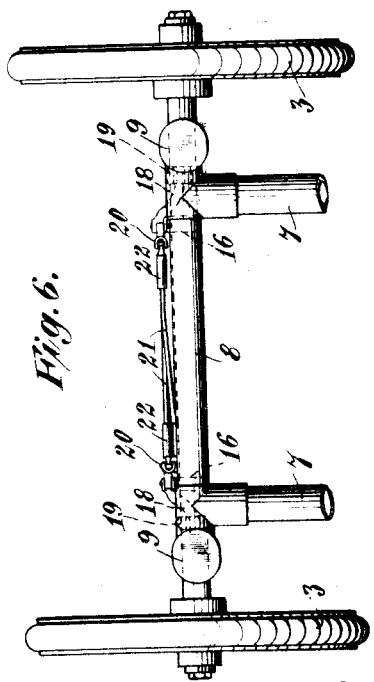

UNITED STATES PATENT OFFICE.

CHARLES A. ERICKSON, OF PLATTSBURG, NEW YORK.

PNEUMATIC SUSPENSION FOR VEHICLES.

1,104,294.      Specification of Letters Patent.      Patented July 21, 1914.

Application filed January 20, 1911. Serial No. 603,703.

*To all whom it may concern:*

Be it known that I, CHARLES A. ERICKSON, a citizen of the United States, residing at Plattsburg, in the county of Clinton and State of New York, have invented certain new and useful Improvements in Pneumatic Suspension for Vehicles, of which the following is a specification.

The primary object of this invention is to provide means whereby the body of a vehicle or a load of any kind may be supported by air or other fluid under compression in such manner as to relieve the shocks and strains incident to travel and use, and to avoid the necessity for using pneumatic tires, springs, or similar devices.

A further object of the invention is to provide means whereby the weight imposed upon any particular point of support may be properly equalized between all of the several points of support for the body of the vehicle or the load in order that undue compression may be prevented upon the fluid at any one point.

The various other objects of the invention will be more fully set forth in the following description of one form of mechanism embodying my invention, which consists in the new and novel features of construction and combinations of parts hereinafter set forth and claimed.

In the accompanying drawings:—Figure 1 represents a plan view of the supporting frame of a vehicle embodying my improvements, shown partly in section. Fig. 2 is a side elevation showing one of the supporting members in section. Fig. 3 is an end view of the front axle having the supporting frame thereon, shown partly in section. Fig. 4 is a similar view of the rear axle. Fig. 5 is a front view of the supporting frame and equalizing device. Fig. 6 represents a plan view of the same. Figs. 7 and 8 are detail views showing the spring members and means for attaching the same.

The running gear of the vehicle comprises the front axle 1, the rear axle 2 and the wheels 3, which may be of any preferred construction. Secured to the front and rear axle near the ends thereof, in suitable position with relation to the frame or body (not shown) of the vehicle, are the four relatively stationary members of the suspension mechanism comprising the barrels or pistons 4 which are preferably pivoted to the axles by pivot bolts 5 that pass through and are secured in brackets or collars 6. The relatively movable member of the suspension mechanism comprises tubular side pieces 7 and end pieces 8 of an approximately rectangular frame operating as, or corresponding in a general way with, the frame or chassis of the vehicle and also comprising plungers or cylinders 9 located at the respective corners of the frame, which engage with and slide upon the relatively stationary members 4. Communication is established between the interior of the frame and the barrels or cylinders by a passage 10, which may be formed in the wall of the plunger. A suitable valve or cock 11 is provided, which permits compressed air or other fluid under pressure to be introduced into the frame, and consequently into the chamber or space between the barrel and plunger. Packing rings 12 are arranged on the barrel, which prevent the escape of the fluid from said compression chamber.

In order to maintain the compression of the air or fluid practically constant, one of the parts of the frame, for example one of the side pieces 7 is divided from the other portion of the frame by means of the one-way valves 14, 14ᵃ the valve 14 being an inlet valve, which permits the fluid to enter the central space and the other valve, as 14ᵃ providing an outlet therefrom. The valve 14 is so regulated by any suitable means that it will not permit the fluid to pass until it has reached a pre-determined pressure, which is above the normal pressure of the system, and the valve 14ᵃ is so adjusted that it will not permit the fluid to escape until the pressure in the rest of the system has fallen below the predetermined normal pressure. Whenever, therefore, by reason of inequalities in the load or for other reasons, the fluid becomes compressed above a certain limit, a small quantity thereof will be admitted into the pressure portion of the system, which will become available in case the pressure falls below the predetermined limit.

In order to compensate for unequal and improper loading of the vehicle, which would tend to put an excess weight upon one side or one end of the vehicle, an equalizing device is provided which comprises arms 16 depending from the frame at or near opposite corners thereof, and the bell crank levers 17 fulcrumed on said arm and having one end as 18 pivoted to a bracket or collar 19 secured to the axle. The free end 20 of each bell crank lever is connected by a rod 21 to the end of the arm 16 depending from the opposite corner of the vehicle. Said rods 21 are diagonally arranged with respect to each other and each comprises a flexible or tension member 22 which may be of any preferred construction. Preferably, however, the tension member comprises a sleeve 24 secured to one part of the rod 21 and containing a plunger 25 secured directly to the end of the bell crank. A spring 26 is arranged between a suitable head 27 provided on the plunger and the end of the sleeve, which tends to resist and equalize any horizontal inequalities between the sides of the vehicle and prevent binding between the contacting surfaces of the pistons and the plungers.

In the operation of my device, the air or other fluid under pressure is supplied to the hollow frame by any suitable means as a pump (not shown). This fluid enters the compression space between the head of the cylinder and the end of the piston, and forms a cushion upon which the frame rests. The necessary flexion of the frame is obtained by the swivel connection between the barrel and the axle, but any pronounced lateral movement is prevented by the long contacting surfaces between the barrel and the plunger. The pressure is maintained approximately constant by the reserve fluid which is maintained at a pressure above normal, and which automatically feeds enough fluid to the system to maintain the pressure approximately constant in spite of leakage. In the case of improper loading the equalizing device will tend to hold the vehicle in its horizontal or approximately horizontal position. By means of this construction the use of springs, pneumatic tires and similar resilient devices may be entirely dispensed with, as the jars and shocks caused by traveling over a rough surface such as is provided by ordinary roads, will be absorbed and taken up by air cushions formed between the relatively stationary and the relatively movable parts of the suspension mechanism. Consequently the principal items of expense in the up-keep of an automobile or similar self-propelled vehicle are eliminated. The parts can be easily constructed and no special equipment of any kind is necessary, since, in case of excessive leakage, a fresh supply of air can be forced into the frame by means of the ordinary air pump such as is employed at the present time to inflate the pneumatic tires which are commonly used.

Although I have described in detail one form of mechanism embodying my invention, it will be obvious that various changes within the skill of the mechanic may be made in the construction herein shown and described without departing from the spirit of the invention, provided the means set forth in the following claims be employed.

I claim as my invention:—

1. In a pneumatic suspension for vehicles the combination with a running gear, of a plurality of relatively stationary members pivoted to said running gear, a relatively movable member mounted upon said stationary members comprising a hollow frame containing a fluid under compression and a plurality of plungers engaging with said relatively stationary members to form compression chambers and a passage formed in the wall of each plunger for supplying fluid under pressure to said chambers from the frame and means for supplying fluid under pressure to said frame.

2. In a pneumatic suspension for vehicles the combination with the running gear, of a plurality of pistons having a long contacting surface secured to said running gear, a hollow frame movable on said pistons and forming a compression chamber between the same at the end of each piston, means for supplying fluid under pressure to said frame and chambers, and valves in said frame spaced apart to form a compartment to receive fluid having relatively higher pressure than the fluid in the other part of the frame.

3. In a vehicle, the combination with the running gear and body provided with a hollow frame affording an air chamber, of means for supporting the body upon the running gear comprising a pair of members pivotally secured in spaced relation upon the running gear to swing in the same plane, a pair of members secured to the frame and telescoping with the first pair to form air cushion supports having communication with the air chamber of the body, a pair of levers movable substantially in the swinging plane of the members and fulcrumed to the body and each lever having one arm pivotally connected to the running gear and a pair of crossed members formed in sections, each member connecting the other arm of one of the levers with the body at a point near the opposite lever and springs for connecting the sections to yieldingly oppose the lengthening of said members to thereby resist the swinging of the telescoping members and the recoil thereof when compressed.

4. In a vehicle the combination with the running gear and body, of a pair of pneumatic supports pivotally secured in spaced relation upon the running gear to adapt them to swing in the same plane and rigidly secured to the body to afford resilient supporting means therefor, a retarding means including a bracket rigidly secured to the body within the space between the supports, a lever fulcrumed to the bracket and pivotally secured by one of its arms to the running gear, a member formed in sections connecting the other arm of the lever with the body at a point spaced from said bracket, and a spring engaged by said sections to yieldingly oppose the lengthening of said members to thereby resist the swinging of said pneumatic supports and recoil thereof when compressed.

This specification signed and witnessed this 10th day of January, A. D. 1911.

CHARLES A. ERICKSON.

Signed in the presence of—
HELEN M. DAMES,
AMBROSE L. O'SHEA.